US012556846B2

(12) United States Patent
Shen et al.

(10) Patent No.: US 12,556,846 B2
(45) Date of Patent: Feb. 17, 2026

(54) EARPHONE

(71) Applicant: AAC KAITAI TECHNOLOGIES (WUHAN) CO., LTD, China (CN)

(72) Inventors: Yu Shen, Shenzhen (CN); Yiwei Zhou, Shenzhen (CN); Qiang Dan, Shenzhen (CN); Yang Li, Shenzhen (CN)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 248 days.

(21) Appl. No.: 18/304,380

(22) Filed: Apr. 21, 2023

(65) Prior Publication Data

US 2024/0121538 A1 Apr. 11, 2024

Related U.S. Application Data

(63) Continuation of application No. PCT/CN2022/127379, filed on Oct. 25, 2022.

(30) Foreign Application Priority Data

Oct. 11, 2022 (CN) ........................ 202222694866.X

(51) Int. Cl.
*H04R 1/02* (2006.01)
*H04R 1/10* (2006.01)
*H04R 1/28* (2006.01)
*H04R 17/00* (2006.01)

(52) U.S. Cl.
CPC ................. *H04R 1/02* (2013.01); *H04R 1/10* (2013.01); *H04R 1/28* (2013.01); *H04R 17/00* (2013.01)

(58) Field of Classification Search
CPC ............. H04R 1/10; H04R 1/28; H04R 17/00
See application file for complete search history.

(56) References Cited

U.S. PATENT DOCUMENTS 4,418,248 A * 11/1983 Mathis ..................... H04R 1/26 381/373
2016/0316292 A1* 10/2016 Huang ................. H04R 1/1016
2024/0007804 A1* 1/2024 Qi ............................ G10K 9/13

FOREIGN PATENT DOCUMENTS

TW M610874 U * 4/2021

OTHER PUBLICATIONS

Translation of TWM610874U (Year: 2021).*

* cited by examiner

*Primary Examiner* — Andrew Sniezek
(74) *Attorney, Agent, or Firm* — Wiersch Law Group

(57) ABSTRACT

An embodiment of the present disclosure provides an earphone, which includes a housing with a cavity, a first speaker housed in the cavity for producing low-frequency sounds, a second speaker for producing mid to high frequency sounds, and a sound damping mesh. The housing includes a sound outlet penetrating therethrough, and the cavity is connected with the outside through the sound outlet. The second speaker is fixed to the sound damping mesh. The sound damping mesh completely separates the first speaker from the second speaker. The low-frequency sound emitted by the first speaker is transmitted to the sound outlet through the sound damping mesh.

7 Claims, 6 Drawing Sheets

EARPHONE

TECHNICAL FIELD

The disclosure relates to the field of electro-acoustic transducers, in particular to an earphone used in portable mobile electronic products.

BACKGROUND ART

The earphone is widely used in portable mobile electronic products, such as mobile phones, to convert audio signals into sound playback. With the expansion of the consumer market, the requirements for the quality of the earphone are getting higher and higher, especially the application of high frequency bands (such as 6 kHz~10 kHz) and ultrasonic frequency bands (such as 20 kHz~40 kHz), for example, sound waves with a frequency of 10 kHz~20 kHz can bring people a richer auditory experience, the ultrasonic segment can scan the shape of the human ear canal and customize a personalized hearing experience through algorithms. Therefore, high performance for the above frequencies is an important index in the acoustic performance of the earphone.

For the earphone of the related technology, please refer to FIG. 1, which is a schematic view of the earphone of the related technology. The earphone in the related art includes a housing S1 and a first speaker A1 and a second speaker A2 accommodated in the housing S1. The housing S1 is provided with a sound outlet S10 penetrating therethrough. The sound from the first speaker A1 and the sound from the second speaker A2 is sent to the outside world through the sound outlet. The first speaker A1 works in the low frequency band, the second speaker A2 works in the middle and high frequency bands and ultrasonic frequency bands, the second speaker A2 is stacked on the first speaker A1 and located between the first speaker A1 and the sound outlet S10.

However, the earphone of the related art, as for the first speaker A1 working in the low frequency band, in order to improve low-frequency performance, improve bass hearing, and improve the sound pressure level (SPL), the first speaker A1 is designed to be larger in size. Since the earphone housing S1 is a structure with one end wide and one end narrow. In TWS earphone, the first speaker A1 can only be placed at the wider end of the housing S1 due to its larger size after assembly, further, it is far away from the sound outlet S10, but the second speaker A2 is stacked on the first speaker A1, so the distance between the second speaker A2 and the sound outlet S10 is relatively large. Moreover, the appearance of the cavity in the earphone causes the original resonance peak of the original auditory canal cavity to shift or decrease, resulting in the lowering of the sound pressure level SPL in the high frequency band.

Please refer to FIG. 2, the sound from the second speaker A2 near the front of the sound outlet S10 bypasses the second speaker A2 periphery and flows to the back, that is, it flows to the front of the first speaker A1 and flows out from the other side of the first speaker A1, and superimposed with the sound wave directly in front of the second speaker A2, so that interference of sound waves occurs, causing the sound pressure level to decrease. A technical problem that needs to be solved is how to improve the sound propagation of the earphone in the low frequency band, improve the sound pressure level (SPL) and avoid sound wave interference.

Therefore, it is necessary to provide a new earphone to solve the above-mentioned technical problems.

SUMMARY OF THE INVENTION

The purpose of the present disclosure is to provide an earphone with good acoustic performance.

Accordingly, the present disclosure provides an earphone, including: a housing having a cavity, and a sound outlet penetrating therethrough, for communicating the cavity with an outside; a first speaker housed in the cavity for producing low frequency sounds; a second speaker located between the first speaker and the sound outlet for producing mid to high frequency sounds; and a sound damping mesh locating between the first speaker and the second speaker, and being fixed to the second speaker. The sound damping mesh completely separates the first speaker from the second speaker so that the low-frequency sounds emitted by the first speaker are transmitted to the sound outlet through the sound damping mesh, and at the same time, the mid-high frequency sounds generated by the second speaker are transmitted to the first speaker for achieving filtering reduction.

In addition, the sound damping mesh includes an upper cover and a plurality of the damping sound output holes penetrating through the upper cover; the upper cover covers a diaphragm of the first speaker and is fixed on a side of the diaphragm close to the sound outlet; the upper cover and the diaphragm are spaced apart for forming a front sound cavity; the second speaker is fixed on a side of the upper cover close to the sound outlet; and the damping sound output hole communicates with the front sound cavity via the sound outlet.

In addition, the sound damping mesh includes an upper cover and an impedance mesh; the upper cover covers a diaphragm of the first speaker and is fixed on a side of the diaphragm close to the sound outlet; the upper cover and the diaphragm are spaced apart for forming a front sound cavity; the upper cover is provided with a plurality of the sound output holes penetrating therethrough; the impedance mesh completely covers the sound output hole; the front sound cavity is connected with the outside through the sound output hole, the impedance mesh and the sound outlet in sequence; the second speaker is fixed on a side of the impedance mesh close to the sound outlet.

In addition, the sound damping mesh includes a fixed frame and an impedance mesh attached to the fixed frame; the fixed frame is fixed on the housing, and the fixed frame includes a plurality of the air leaking holes; the impedance mesh completely covers the air leaking holes; the second speaker is to fixed to the sound damping mesh; the second speaker and the sound damping mesh together divide the cavity into a front cavity and a rear cavity; the front cavity is connected with the outside through the sound outlet, the second speaker is at least partially contained within the front cavity; the first speaker is accommodated in the rear cavity, and is spaced apart from the sound damping mesh.

In addition, the impedance mesh is set on a side of the fixed frame close to the sound outlet, or the impedance mesh is set on a side of the fixed frame away from the sound outlet.

In addition, the impedance mesh is set on the side of the fixed frame close to the sound outlet, and the second speaker is fixed on the side of the impedance mesh close to the sound outlet.

In addition, the sound damping mesh is provided with a mounting hole penetrating therethrough, the second speaker matches the mounting hole; the second speaker at least partially passes through the mounting hole and forms an integral structure with the sound damping mesh.

In addition, the impedance mesh is set on the side of the fixed frame close to the sound outlet.

In addition, the fixed frame is integrally formed with the housing.

In addition, the second speaker is a MEMS piezo speaker, and the first speaker includes a movable coil.

Compared with the related technology, in the earphone provided by the present disclosure, the sound damping mesh is set between the first speaker and the second speaker. the sound damping mesh completely separates the first speaker from the second speaker, so that the low-frequency sound generated by the first speaker passes through and the mid-high frequency sound generated by the second speaker is prevented from passing through. This setting prevents the middle and high frequency sounds from the second speaker from being superimposed on the front through the periphery of the first speaker. This setting avoids the sound wave interference phenomenon, thereby improving the sound pressure level and making the sound more pure, so that the acoustic performance of the earphone provided by the present disclosure is good.

DETAILED DESCRIPTION OF EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
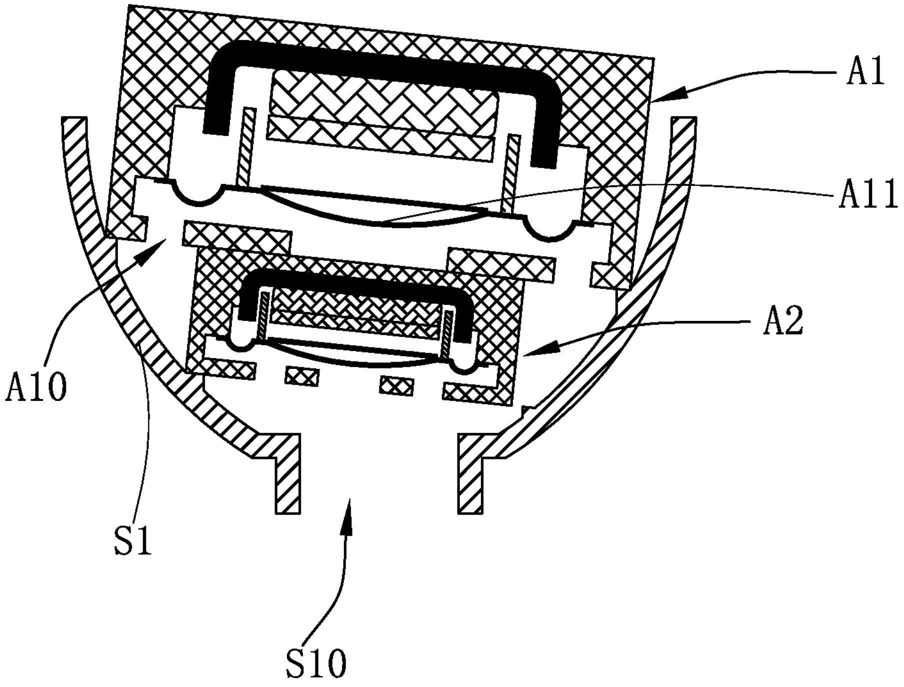
Fig. 1 (Related Art)
FIGS. 1-2 illustrate an earphone of the related art.
Figure 2:
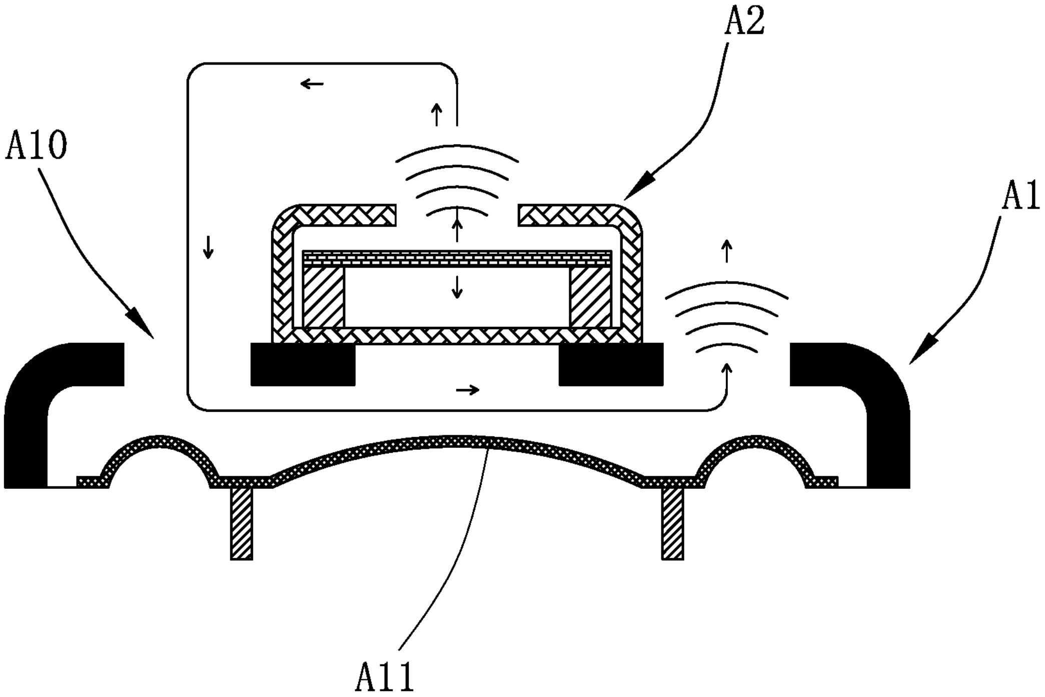
Fig. 2 (Related Art)
Figure 3:
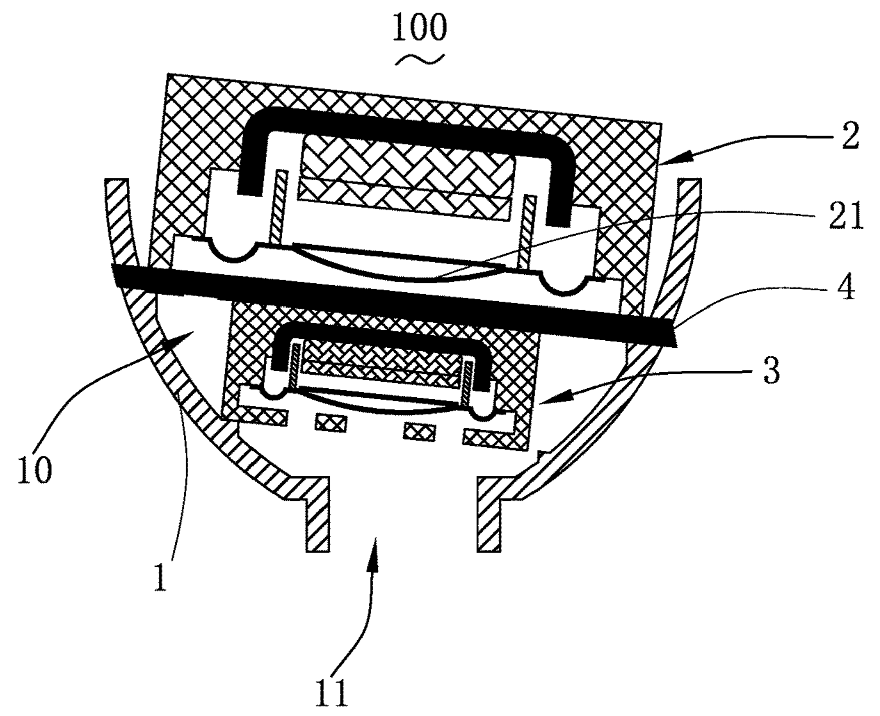
FIG. 3 illustrates an earphone of an embodiment of the present disclosure.

The present disclosure provides an earphone 100. Please refer to FIG. 3, which is a schematic view of the earphone 100 of the present disclosure. The earphone 100 includes a housing 1 with an cavity 10, a first speaker 2, a second speaker 3 and a sound damping mesh 4. The housing 1 is provided with a sound outlet 11 penetrating therethrough. The cavity 10 is connected with the outside through the sound outlet 11.

The first speaker 2 is used to generate low frequency sound. The first speaker 2 works in a low frequency range of 10 Hz~3 kHz. The first speaker 2 is accommodated in the cavity 10.

The first speaker 2 includes a diaphragm 21 for sounding. The diaphragm 21 is facing the sound outlet 11.

The second speaker 3 is used to generate sounds in the mid-high frequency and ultrasonic frequency bands. The second speaker 3 works in the range of mid-high frequency and ultrasonic frequency range from 3 kHz to 40 kHz. The second speaker 3 is accommodated in the cavity 10. The second speaker 3 is to located between the first speaker 2 and the sound outlet 11.

In this embodiment, the second speaker 3 is a MEMS piezo speaker, and the first speaker 2 is a speaker with movable coil. The small volume of the MEMS piezo speaker can make the miniaturization application of the earphone 100 better. The low-frequency sound effect generated by the first speaker 2 which is the speaker with movable coil is good.

The sound damping mesh 4 is set between the first speaker 2 and the second speaker 3. The second speaker 3 is fixed on the sound damping mesh 4. The sound damping mesh 4 completely separates the first speaker 2 from the second speaker 3, so that the low-frequency sound generated by the first speaker 2 is transmitted to the sound outlet 11 through the sound damping mesh 4. The sound damping mesh 4 will block the mid-high frequency sound from the second speaker 3 to achieve filtering reduction. This setting prevents the mid-high frequency sound emitted by the second speaker 3 from going around the periphery of the first speaker 2 to be superimposed forward. The phenomenon of sound wave interference is avoided, thereby improving the sound pressure level and making the sound more pure, so that the acoustic performance of the earphone 100 provided by the present disclosure is good.

Embodiment 1

Figure 4:
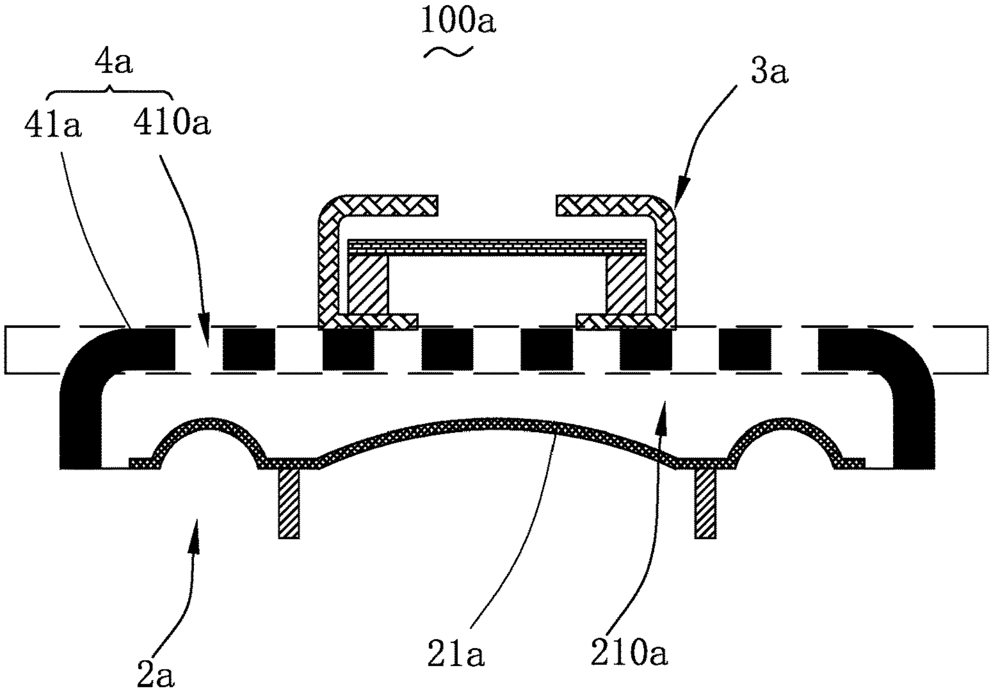
FIG. 4 illustrates a first embodiment of first speaker, a second speaker and a sound damping mesh of the earphone.

The embodiment 1 of the present disclosure also provides an earphone 100*a*. Please refer to FIG. 4, FIG. 4 is a schematic view of the first speaker 2*a*, the second speaker 3*a* and the sound damping mesh 4*a* of the earphone 100*a* of the embodiment 1 of the present disclosure.

The first speaker 2*a* includes a diaphragm 21*a* for sounding.

The sound damping mesh 4*a* includes an upper cover 41*a*, and a plurality of the damping sound output holes 410*a* penetrating through the upper cover 41*a*.

The upper cover 41*a* covers and is fixed on the diaphragm 21*a* near the sound outlet 11, the upper cover 41*a* is spaced from the diaphragm 21*a* and together forms a front sound cavity 210*a*.

The second speaker 3*a* is fixed on the side of the upper cover 41*a* close to the sound outlet 11.

The damping sound output hole 410*a* connects the front sound cavity 210*a* with the sound outlet 11, so that the low-frequency sound emitted by the first speaker 2*a* is transmitted to the sound outlet 11 through the damping sound output hole 410*a*, at the same time, the middle and high frequency sounds emitted by the second speaker 3*a* can achieve filtering reduction. In the embodiment 1, the damping sound output hole 410*a* is used, and the sound damping mesh 4*a* prevents the mid-high frequency sound emitted by the second speaker 3*a* from passing through. This setting prevents the middle and high frequency sound pressure emitted by the second speaker 3*a* from going around the periphery of the first speaker 2*a* to be superimposed forward, the sound wave interference phenomenon is avoided, thereby improving the sound pressure level and making the sound more pure, so that the acoustic performance of the earphone 100*a* provided by the present disclosure is good.

By designing the area and height of the damping sound output hole 410*a*, the damping sound output hole 410*a* can have the effect of sound damping. The working principle of the damping sound output hole 410*a* is:

The cross-sectional area of the front sound cavity 210*a* along the vibration direction perpendicular to the diaphragm 21*a* is S1, the cross-sectional area perpendicular to the vibration direction of the damping sound output hole 410*a* S2, the length of the damping sound output hole 410*a* along the vibration direction perpendicular to the diaphragm 21*a* is ι, the sound intensity transmission coefficient of the first speaker 2*a* is ti, Pt is the transmitted sound pressure, Pi is the sound pressure of the incident wave. The following formula (1) is satisfied:

$$t_i = \frac{|P_t|^2}{|P_i|^2} = \frac{4}{4\cos^2 k\iota + (S_{12} + S_{21})^2 \sin^2 k\iota}, \tag{1}$$

Wherein, k is the constant of the sound intensity transmission coefficient.

$$S_{12} = \frac{S_2}{S_1}.\ S_{21} = \frac{S_1}{S_2}.$$

In the earphone 100*a* of embodiment 1 of the present disclosure, the upper cover 41*a* with the movable coil is skillfully adopted and the damping sound output hole 410*a* is set, the structure is simple, easy to assemble, and the acoustic performance of the earphone 100*a* provided by the present disclosure is good.

Embodiment 2

Figure 5:
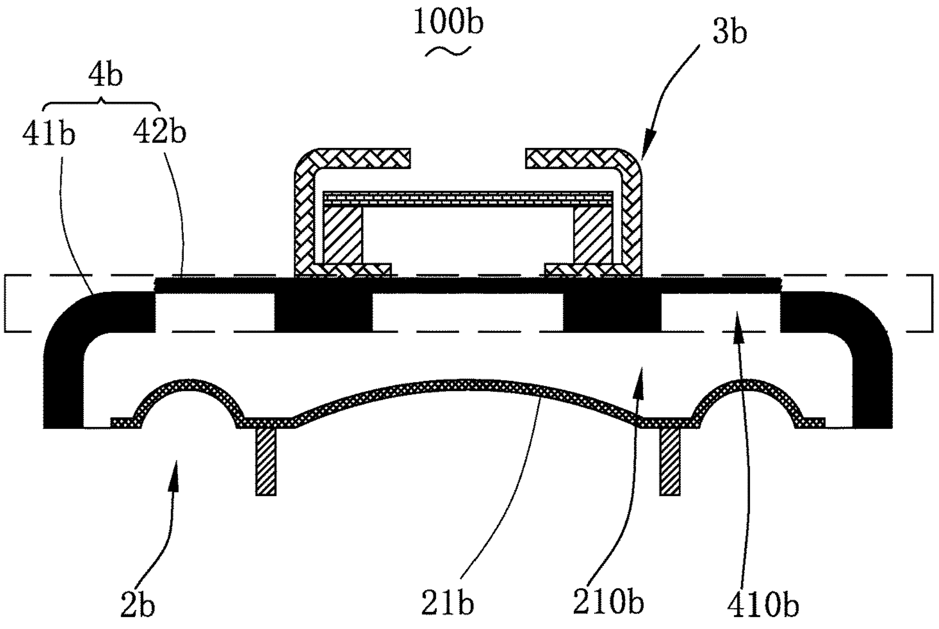
FIG. 5 illustrates a second embodiment of a first speaker, a second speaker and a sound damping mesh of the earphone.

Embodiment 2 of the present disclosure also provides a earphone 100*b*. Please refer to FIG. 5, FIG. 5 is a schematic view of the first speaker 2*b*, the second speaker 3*b* and the sound damping mesh 4*b* of the earphone 100*b* in the embodiment 2 of the present disclosure.

The earphone 100*b* of the embodiment 2 has the same basic structure as the earphone 100*a* of the embodiment 1. The first speaker 2*b* includes a diaphragm 21*b* for vocalization. The sound damping mesh 4*b* includes an upper cover 41*b* and an impedance mesh 42*b*.

The upper cover 41*b* covers the diaphragm 21*b* and is fixed on the side of the diaphragm 21*b* close to the sound outlet 11. The upper cover 41*b* is spaced from the diaphragm 21*b* and together forms a front sound cavity 210*b*.

The upper cover 41*b* is provided with a plurality of the sound output holes 410*b* penetrating therethrough. In the embodiment 2, the sound output hole 410*b* is a common through hole, which is used to connect the front sound cavity 210*b* with the sound outlet 11. Of course, it is not limited to this, in order to better realize that the earphone 100*b* improves the sound pressure level and makes the sound more pure, the sound output hole 410*b* of the sound damping mesh 4*b* can be set to the structure of the damping sound output hole 410*a* in the embodiment 1.

The second speaker 3*b* is fixed on the side of the impedance mesh 42*b* close to the sound outlet 11. The impedance mesh 42*b* completely covers the sound output hole 410*b*. The front sound cavity 210*b* is connected with the outside through the sound output hole 410*b*, the impedance mesh 42*b* and the sound outlet 11 in sequence.

The impedance mesh 42*b* (acoustic mesh) can make the 10 Hz-3 kHz sound from the first speaker 2*b* in charge of the bass pass smoothly, so that the sound pressure level SPL loss of the earphone 100*b* is minimal, while the second speaker 3*b* in charge of the treble emits 3 kHz-40 kHz sound propagation. Due to the effect of the impedance mesh 42*b*, the sound pressure level of the sound wave in the range reaching the front sound cavity 210*b* through the upper cover 41*b* and the sound output hole 410*b* is weakened, when it is transmitted from the sound output hole 410*b* and the impedance mesh 42*b* on the other side, the sound pressure level has been weakened to little, so it can effectively reduce the phenomenon of superposition and interference of sound waves of the same frequency.

More preferably, the earphone 100*b* of the embodiment 2 does not need to close the back cavity of the second speaker 3*b*, because the 10 kHz-40 kHz sound waves emitted by the second speaker 3*b* are also filtered by the impedance mesh 42*b* for many times, the sound pressure level is weakened, which has almost no effect on the sound waves emitted in front, and the airflow can leak out. The effect of the stiffness on the back cavity is correspondingly weak, and hardly affects the resonant frequency of the device.

Embodiment 3

Figure 6:
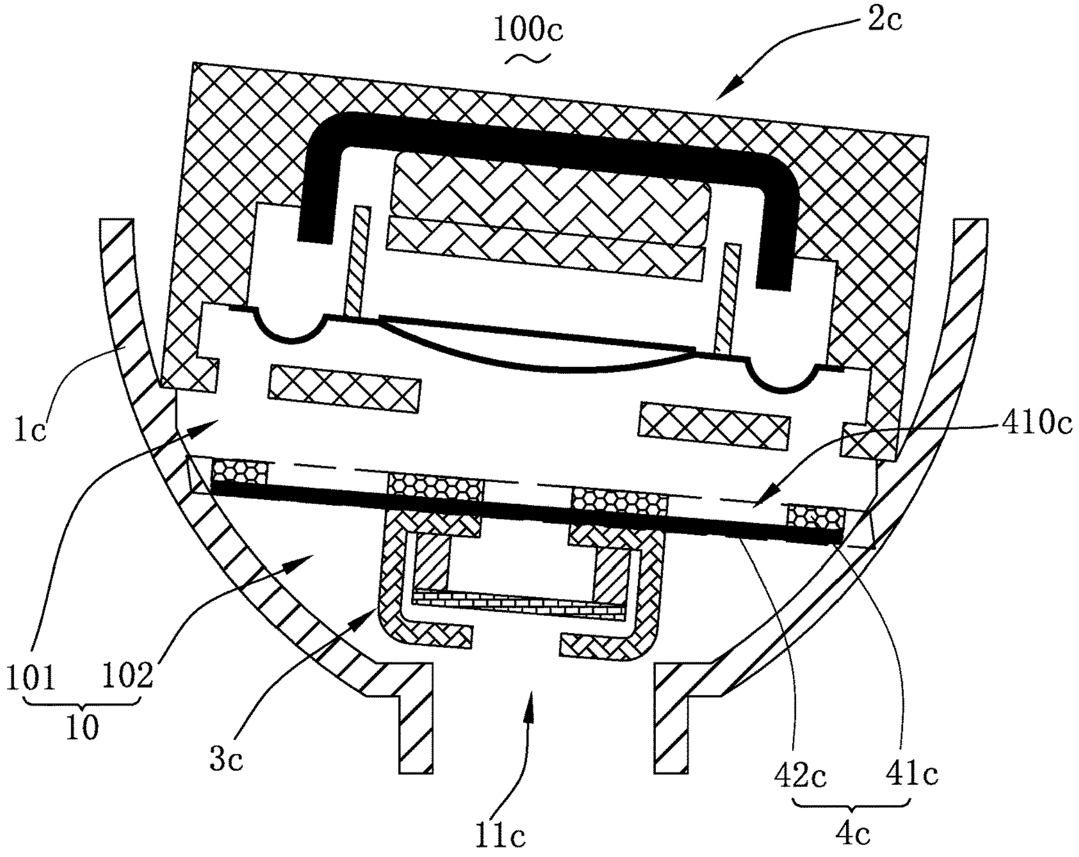
FIG. 6 illustrates an earphone of a third embodiment of the present disclosure.

The embodiment 3 of the present disclosure also provides the earphone 100*c*. Please refer to FIGS. 6-8 at the same time.

The earphone 100*c* of the embodiment 3 has the same basic structure as the earphone 100*a* of the embodiment 1, the difference between the two is:

The sound damping mesh 4*c* includes a fixed frame 41*c* and an impedance mesh 42*c* attached to the fixed frame 41*c*.

The fixed frame 41*c* is used to fix the second speaker 3*c*. Wherein, the fixed frame 41*c* is fixed on the housing 1*c*. In the embodiment 3, the fixed frame 41*c* and the housing 1*c* are integrally formed. That is, the fixed frame 41*c* and the housing 1*c* are integrally structured, which is conducive to production assembly and improves production efficiency. Of course, it is not limited thereto, and it is also possible that the fixed frame 41*c* and the housing 1*c* are independent structures.

Figure 7:
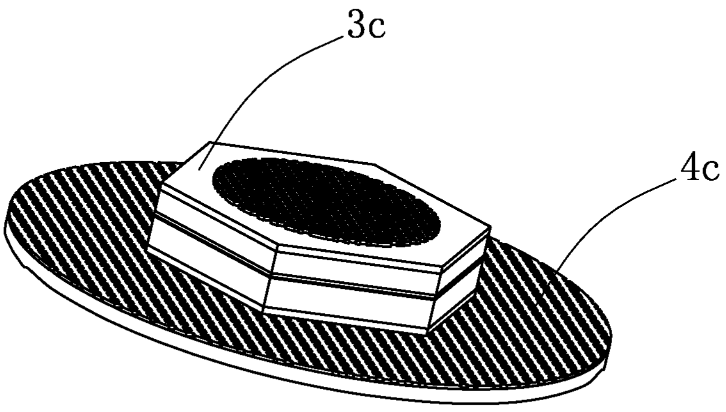
FIG. 7 is an isometric view of a second speaker and a sound damping mesh of the earphone in the third embodiment.
Figure 8:
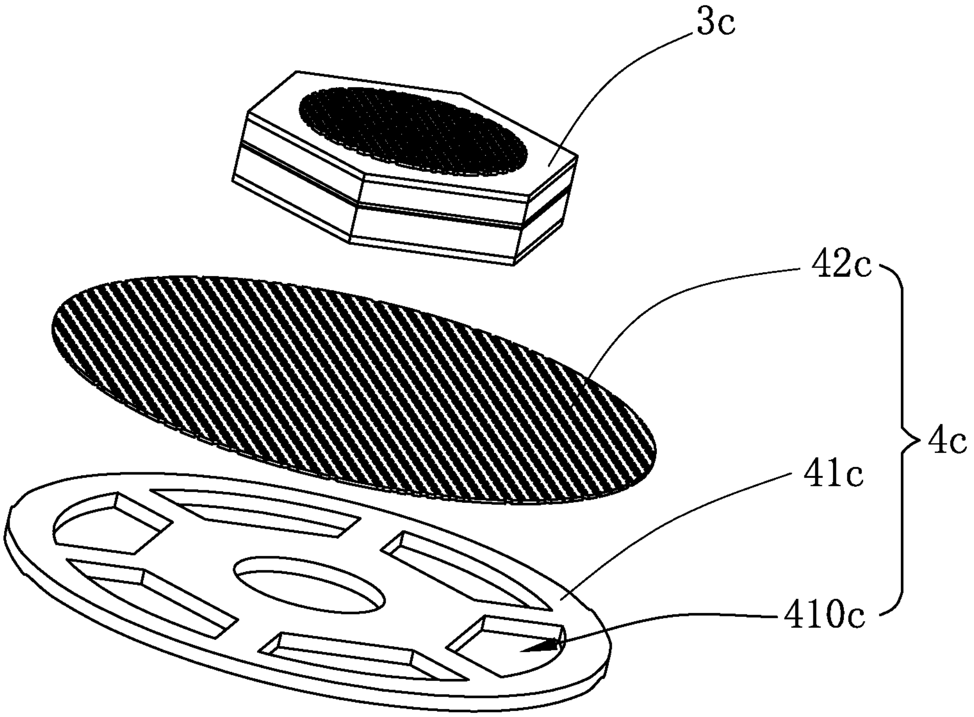
FIG. 8 is an exploded view of the earphone in FIG. 7.

The fixed frame 41*c* is provided with a plurality of the air leaking holes 410*c*. The impedance mesh 42*c* completely covers the air leaking hole 410*c*. The fixed frame 41*c*, which is oval, circular or irregular in shape is attached the earphone housing 1*c*, The outer boundaries given in FIG. 7 and FIG. 8 are circular and symmetrical in design. The solid part in the middle of the fixed frame 41*c* described in the embodiment 3 is used to fix the second speaker 3*c*, the air leaking hole 410*c* on the edge, which facilitates the passage of sound waves. In other embodiments, part of the solid body may be of an off-center design.

The impedance mesh 42*c* is set on the side of the fixed frame 41*c* close to the sound outlet 11*c*, or the impedance mesh 42*c* is set on the side of the fixed frame 41*c* away from the sound outlet 11*c*. In the embodiment 3, the impedance mesh 42*c* is set on the side of the fixed frame 41*c* close to the sound outlet 11*c*.

The second speaker 3*c* is fixed to the sound damping mesh 4*c*. In the embodiment 3, the second speaker 3*c* is fixed on the side of the impedance mesh 42*c* close to the sound outlet 11*c*.

The second speaker 3*c* and the sound damping mesh 4*c* together divide the cavity 10 into the front cavity 101 and the rear cavity 102. The front cavity 101 is connected with the outside through the sound outlet 11*c*.

The second speaker 3*c* is at least partially accommodated in the front cavity 101. That is, the second speaker 3*c* is close to the sound outlet 11*c*.

The first speaker 2*c* is accommodated in the rear cavity 102. The first speaker 2*c* and the sound damping mesh 4*c* are spaced apart. In this structure, a certain distance is arranged between the first speaker 2*c* and the sound damping mesh 4*c*.

In the above structure of the earphone 100*c* in the embodiment 3, the second speaker 3*c* is closer to the sound outlet 11*c*, that is, the distance between the earphone 100*c* and the eardrum is closer, so the sound pressure level SPL is to also higher. At the same time, the sound passing through the cavity of the earphone 100*c* is more in line with the cavity of the ear canal, and hardly passes through the cavity of the earphone. Therefore the sound pressure level SPL peak of some self-resonant cavity resonance in the ear canal will not be lost. At the same time, the small cavity at one end of the earphone 100*c* and the sound outlet 11*c* may also form a Helmholtz resonant cavity to increase the sound pressure level of some frequencies in the high frequency.

Embodiment 4

Figure 9:
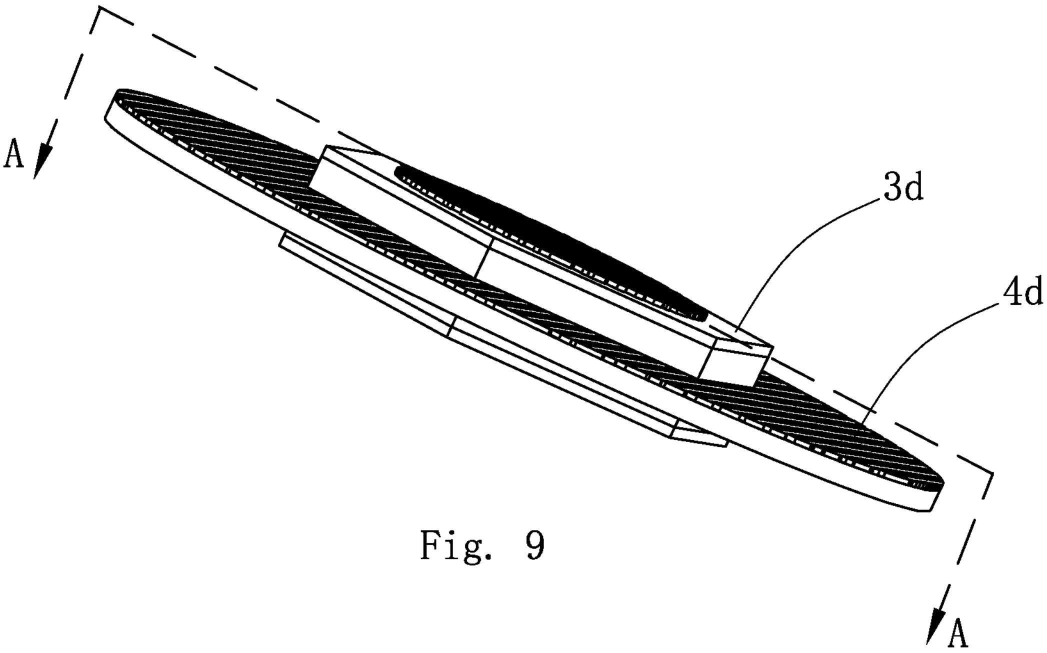
FIG. 9 illustrates an earphone of a fourth embodiment of the present disclosure.
Figure 10:
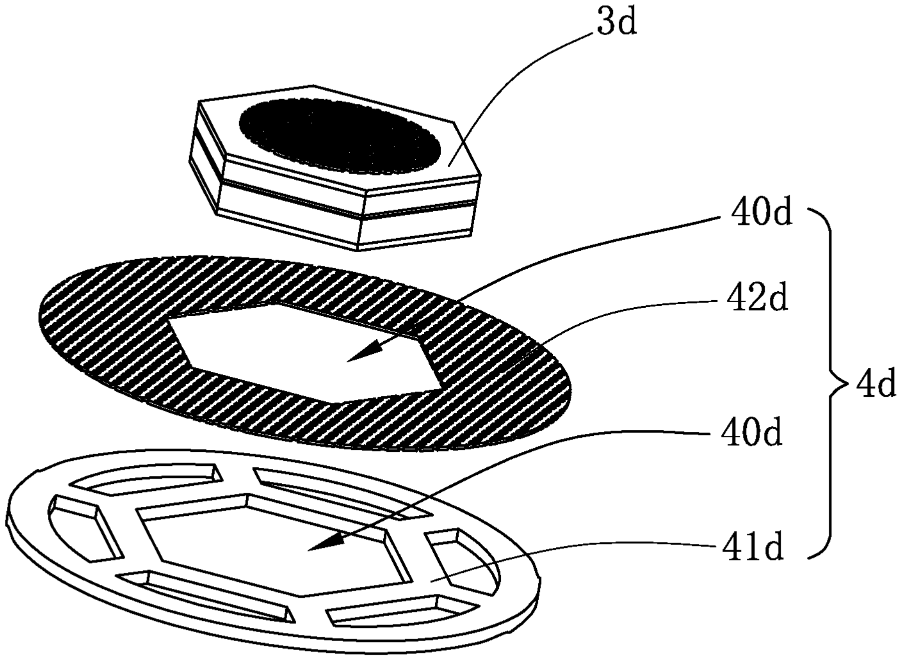
FIG. 10 is an exploded view of the earphone in FIG. 9.
Figure 11:
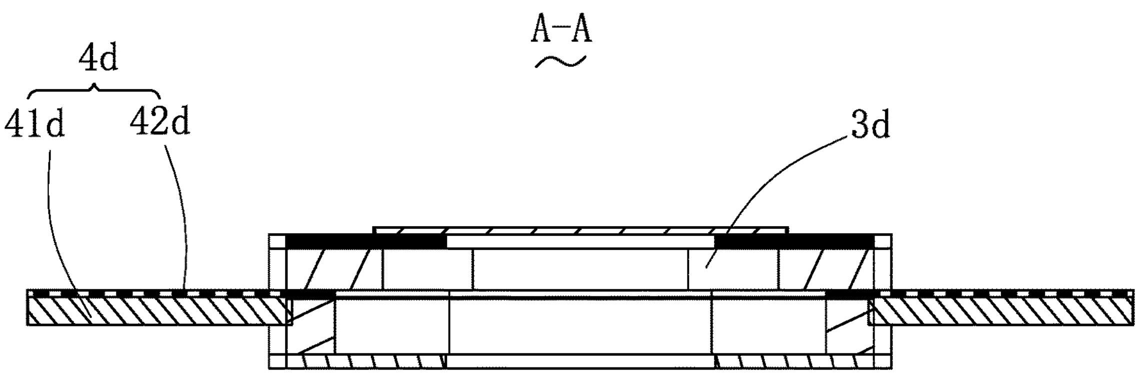
FIG. 11 is a cross-sectional view of the earphone taken along line A-A in FIG. 9.

Embodiment 4 of the present disclosure also provides a earphone 100*d*. Please refer to FIGS. 9-11 at the same time. The earphone 100*d* in the embodiment 4 has the same basic structure as the earphone 100*c* in the embodiment 3, the difference between the two is:

The sound damping mesh 4*d* is provided with the mounting hole 40*d* penetrating therethrough. The second speaker 3*d* matches with the mounting hole 40*d*. The second speaker 3 *d* at least partially passes through the mounting hole and forms an integral structure with the sound damping mesh 4*d*.

The impedance mesh 42*d* is set on the side of the fixed frame 41*d* close to the sound outlet 11*d*.

The assembly structure of the sound damping mesh 4 *d* and the second speaker 3 *d* in the embodiment 4 can utilize the space, so that the assembled volume is small, which is beneficial to the miniaturization application of the earphone 100 *d*.

According to the above-mentioned structure of the earphone 100 and the structure of the earphone 100*a*, the earphone 100*b*, the earphone 100*c*, and the earphone 100*d* of the embodiment. The sound damping mesh 4 weakens the mutual interference of medium and high frequency (>3000 Hz) sound waves in the front and rear of the second speaker 3 responsible for the medium and high frequency bands in the earphone. The impact on the sound pressure level SPL of the front sound is reduced, so that the acoustic performance of the earphone provided by the present disclosure is good.

Figure 12:
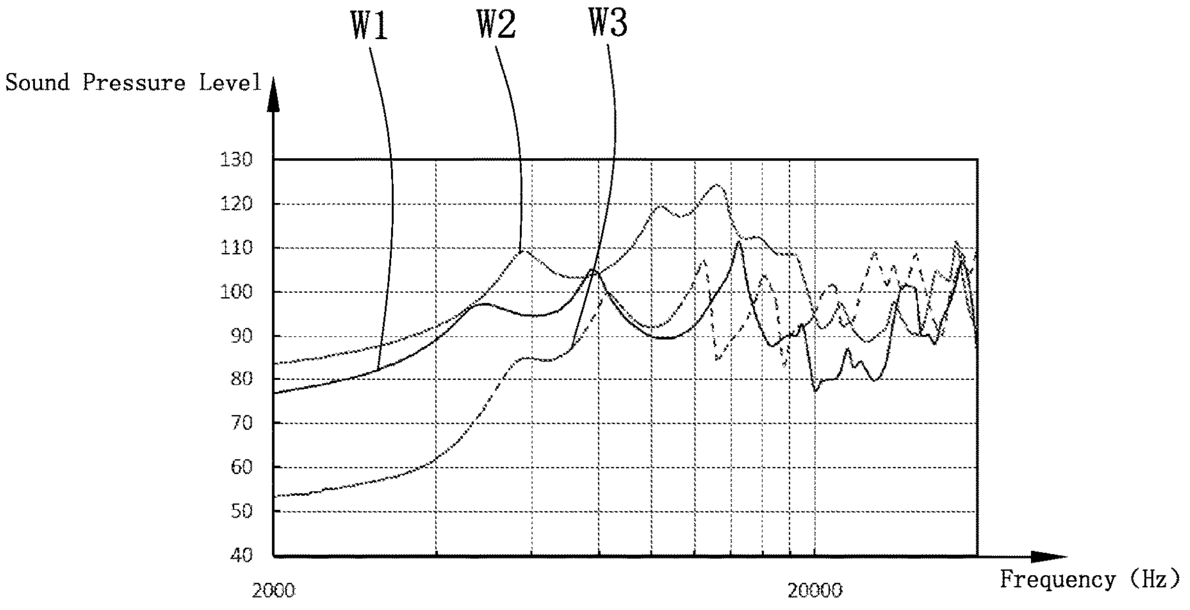
FIG. 12 is a comparison chart of the frequency relationship curve of the sound pressure level between the earphone in the embodiments of the present disclosure and the earphone of the related art.

In the following, the second speaker 3*b* of the earphone 100*a* of the embodiment 2, the second speaker 3*c* of the earphone 100*c* of the embodiment 3 and the earphone of the related technology are measured, according to the measured curve, the comparison description is as follows:

Please also refer to FIG. 12, FIG. 12 is a comparison chart of the frequency relationship curve of the sound pressure level between the earphone of the embodiment of the present disclosure and the earphone of the related art.

In FIG. 12, W1 is the frequency relationship curve of the sound pressure level of the second speaker 3*b* of the embodiment 2. W2 is the frequency relationship curve of the sound pressure level of the second speaker 3*c* in the embodiment 3. W3 is the frequency relationship curve of the sound pressure level of the second speaker of the earphone with the related technology. From FIG. 12, what is obtained is: The second speaker 3*b* of the embodiment 2 can obtain higher the sound pressure level SPL in the frequency range of 3 kHz to 10 kHz, and the overall curve is also flatter. The sound pressure level of the second speaker 3*c* in the embodiment 3 in the frequency range of 3 kHz-40 kH is higher than that of the earphone in the related art.

In summary, the earphone provided by the present disclosure avoids the phenomenon of acoustic wave interference, the sound pressure level is high, and the sound is more pure, so that the acoustic performance of the earphone provided by the present disclosure is good.

Compared with the related technology, in the earphone provided by the present disclosure, the sound damping mesh is set between the first speaker and the second speaker. the sound damping mesh completely separates the first speaker from the second speaker, so that the low-frequency sound generated by the first speaker passes through and the mid-high frequency sound generated by the second speaker is prevented from passing through. This setting prevents the middle and high frequency sound pressure emitted by the second speaker from going around the periphery of the first speaker to be superimposed forward. At the same time, the phenomenon of sound wave interference is avoided, thereby improving the sound pressure level and making the sound more pure, so that the acoustic performance of the earphone provided by the present disclosure is good.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An earphone, including:

a housing having a cavity, and a sound outlet penetrating therethrough, for communicating the cavity with an outside;

a first speaker housed in the cavity for producing low frequency sounds;

a second speaker located between the first speaker and the sound outlet for producing mid to high frequency sounds;

a sound damping mesh locating between the first speaker and the second speaker, and being fixed to the second speaker; wherein the sound damping mesh completely separates the first speaker from the second speaker so that the low-frequency sounds emitted by the first speaker are transmitted to the sound outlet through the sound damping mesh, and at the same time, the sound damping mesh blocks the mid-high frequency sounds generated by the second speaker from passing through for achieving filtering reduction, wherein the sound damping mesh includes a fixed frame and an impedance mesh attached to the fixed frame; the fixed frame is fixed on the housing, and the fixed frame includes a plurality of air leaking holes; the impedance mesh completely covers the air leaking holes; the second speaker is fixed to the sound damping mesh; the second speaker and the sound damping mesh together divide the cavity into a front cavity and a rear cavity; the front cavity is connected with the outside through the sound outlet, the second speaker is at least partially contained within the front cavity; the first speaker is accommodated in the rear cavity, and is spaced apart from the sound damping mesh.

2. The earphone as described in claim 1, wherein, the impedance mesh is set on a side of the fixed frame close to the sound outlet, or the impedance mesh is set on a side of the fixed frame away from the sound outlet.

3. The earphone as described in claim 2, wherein, the impedance mesh is set on the side of the fixed frame close to the sound outlet, and the second speaker is fixed on the side of the impedance mesh close to the sound outlet.

4. The earphone as described in claim 2, wherein, the sound damping mesh is provided with a mounting hole penetrating therethrough, the second speaker matches the mounting hole; the second speaker at least partially passes through the mounting hole and forms an integral structure with the sound damping mesh.

5. The earphone as described in claim 4, wherein, the impedance mesh is set on the side of the fixed frame close to the sound outlet.

6. The earphone as described in claim 1, wherein the fixed frame is integrally formed with the housing.

7. The earphone as described in claim 1, wherein, the second speaker is a MEMS piezo speaker, and the first speaker includes a movable coil.

* * * * *